United States Patent [19]
Mirsky et al.

[11] Patent Number: 5,752,378
[45] Date of Patent: May 19, 1998

[54] PREVENTION OF PARAMETER EXCURSIONS IN GAS TURBINES

[75] Inventors: Saul Mirsky; Naum Staroselsky, both of Des Moines; Brett W. Batson, Dallas Center; Krishnan Narayanan, Ankeny, all of Iowa

[73] Assignee: Compressor Controls Corporation, Des Moines, Iowa

[21] Appl. No.: 683,107

[22] Filed: Jul. 16, 1996

Related U.S. Application Data

[63] Continuation of Ser. No. 287,488, Aug. 8, 1994, abandoned.
[51] Int. Cl.$^6$ ............................................. F02C 9/28
[52] U.S. Cl. ........................................ 60/39.03; 60/39.281
[58] Field of Search ................................ 60/39.03, 39.091, 60/39.161, 39.27, 39.281; 290/40 B, 40 C, 40 F

[56] References Cited

U.S. PATENT DOCUMENTS

| | | | |
|---|---|---|---|
| 3,874,167 | 4/1975 | Katsume et al. | 60/39.091 |
| 4,045,955 | 9/1977 | Brannstrom et al. | 60/39.281 |
| 4,117,668 | 10/1978 | Elsaesser et al. | 60/39.03 |
| 4,280,059 | 7/1981 | Zickwolf | 290/40 B |
| 4,529,887 | 7/1985 | Johnson | 60/39.27 |
| 5,180,923 | 1/1993 | Tyler | 290/40 C |
| 5,252,860 | 10/1993 | McCarty et al. | 60/39.03 |
| 5,272,637 | 12/1993 | Urushidani et al. | 60/39.281 |

OTHER PUBLICATIONS

Fink et al. Electronic Engineer's Handbook McGraw–Hill, New York; 1975. pp. 24–18.

*Primary Examiner*—Louis J. Casaregola
*Attorney, Agent, or Firm*—Henderson & Sturm

[57] ABSTRACT

An improved method is provided for controlling fuel flow to the combustor of a gas generator turbine during sudden changes in load or during a surge cycle of the process turbocompressor. Surge control is initiated by analog input signals emanating from various devices located throughout the compressor-process system. The fuel control system includes input signals from the gas turbine driver. These signals are acted upon by the fuel control system which transmits a signal to a fuel valve actuator that controls the valve that meters fuel to the combustor. In addition to this sequence of control communication, however, is a rate-of-change in the amount of the fuel provided. The rate of the increase of the amount of fuel is determined by current operating functions of the fuel control system. However, because of the characteristics of general load rejection and recovery, and the abrupt nature of surge, the rate of change in the flow rate of fuel is extremely high. This rapid increase of fuel to the combustor may lead to dangerous excursions in temperature, resulting in high temperatures in gas turbine elements. Consequently, a new function is added to the fuel control system's operation whereby improved regulation of the rate of increase of fuel is achieved. This new function receives a signal that either surge or a change in load has been detected. Next, a signal is transmitted to the fuel valve actuator, regulating fuel to the combustor, thus power to the power turbine, thereby preventing overspeeding. After that, the rate of change of the fuel valve is limited for a period of time. Once recovery has been accomplished, the change rate of the fuel valve is gradually returned to a normal operating setting.

20 Claims, 4 Drawing Sheets

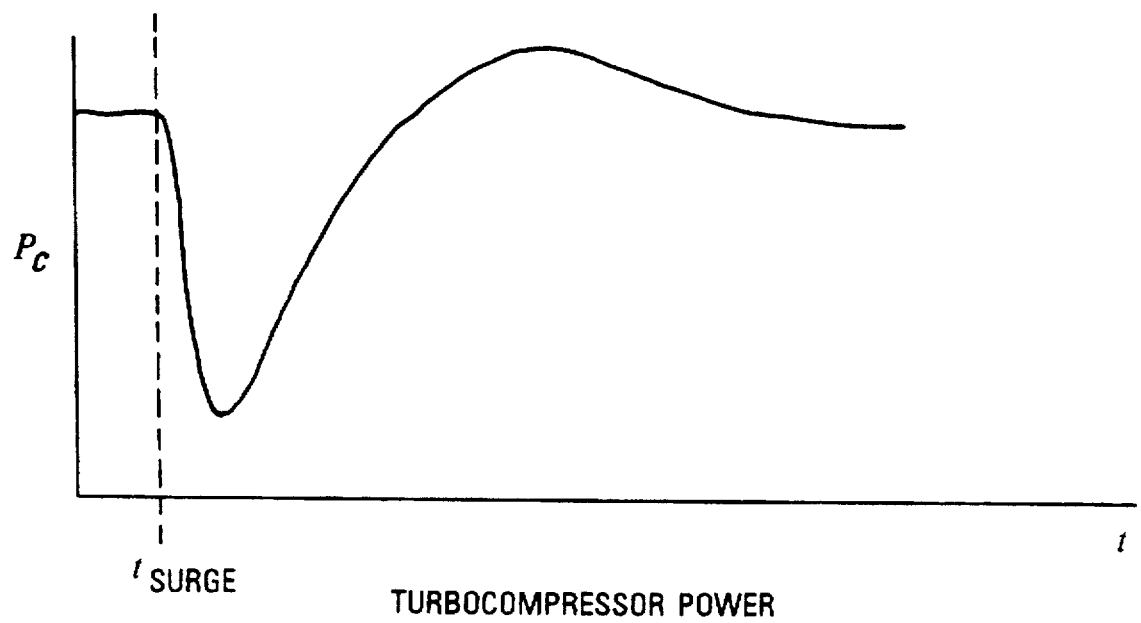
Fig. 2 TURBOCOMPRESSOR POWER
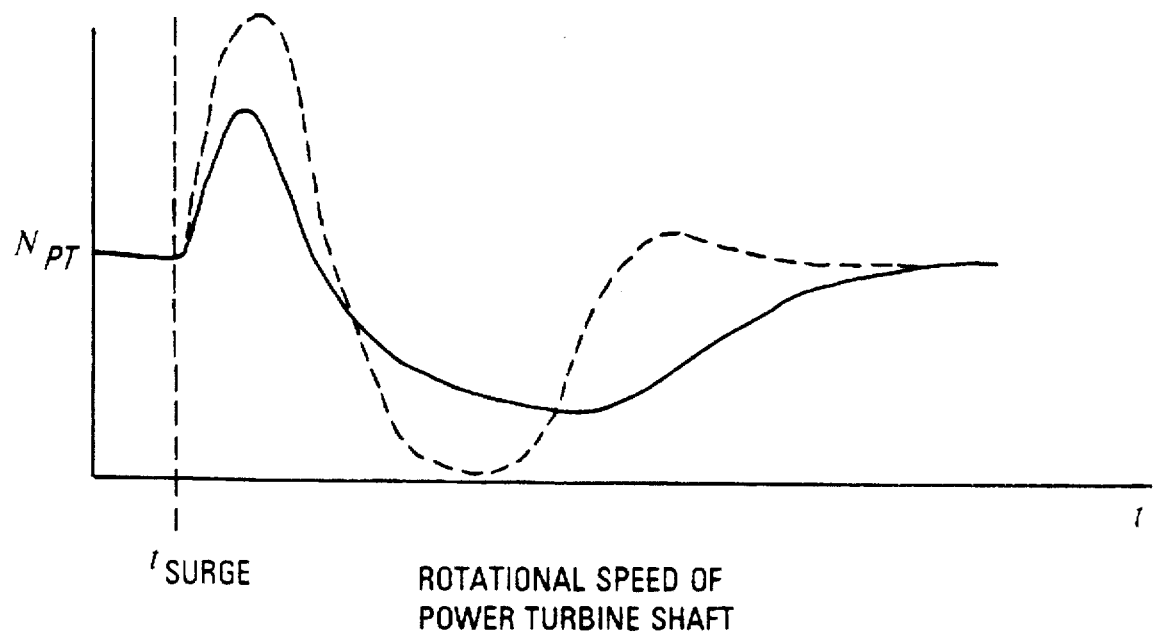
Fig. 3 ROTATIONAL SPEED OF POWER TURBINE SHAFT $x_v$ $t_{SURGE}$  FUEL VALVE POSITION $\left.\dfrac{dx_v}{dt}\right|_{LIMIT}$ $t_{SURGE}$

LIMIT ON RATE-OF-CHANGE OF
FUEL VALVE SET POINT

PREVENTION OF PARAMETER EXCURSIONS IN GAS TURBINES

This is a continuation of application Ser. No. 08/287,488 filed on Aug. 8, 1994 (abandoned).

TECHNICAL FIELD

This invention relates generally to a control method and apparatus for protecting turbomachinery trains by detecting both surge and load rejection, and for the prevention of dangerous thermal and speed excursions in gas turbines driving turbocompressors, specifically by limiting the fuel control system's output rate.

BACKGROUND ART

As is well known, during the initial and recovery stages of surge in turbocompressors, changes in load are very fast, resulting in increased vibration, thrust, temperature, and speed. The rapid excursion of these variables beyond their safe limits can cause extensive damage in only a few seconds. These same dangerous excursions can be experienced as a consequence of load rejection which is attributed to sudden large changes in load.

Rapid flow reversals during surge result in a rapidly changing load. In turn, the rate-of-change of fuel to the combustor of the gas generator turbine can be extremely high. In attempting to compensate for an increase in speed of the power turbine during the initial stage of surge, the fuel control system will begin closing the fuel valve. Inversely, in the recovery stage of surge, when turbocompressor speed falls, the fuel control system commences opening the fuel valve. It is during this recovery stage, when attempting to compensate for reduction in speed, that a rapid increase of fuel to the combustor may lead to dangerous excursions in temperature, causing high temperatures in gas turbine elements. Previously available fuel control methods failed to account for these turbine parameter excursions, and as far as known, there is no background art relative to this subject matter.

For the foregoing reasons, there is a need to easily and accurately prevent the onset of dangerous excursions of the parameters of gas turbines driving turbocompressors. A method that overcomes prior drawbacks would be to rapidly reduce the fuel valve setting at the onset of surge, or at the detection of load rejection, then limit the rate at which the fuel control system's output is allowed to relocate the fuel valve during the recovery stage. Then (after recovery) gradually return the allowable rate to the level of normal operation.

DISCLOSURE OF THE INVENTION

The main purpose of this invention is to provide an improved method for controlling fuel flow to the combustor of a gas generator turbine during a surge cycle of the process turbocompressor, or at the onset of load rejection or load recovery. Presently, surge control is initiated by analog input signals emanating from various devices located throughout the compressor-process system. The fuel control system includes input signals from the gas turbine driver. These signals are then acted upon by the fuel control system which transmits a signal to a fuel valve actuator that controls the valve that meters fuel to the combustor.

This invention incorporates the same sequence of control communication, but its principal advantage over existing control methods involves the rate-of-change in the amount of fuel provided. Currently, as the surge cycle progresses through its initial and recovery stages, the fuel control system will begin closing the fuel valve as the power turbine unloads and increases speed. During the recovery stage, the turbocompressor is loaded and speed decreases. The fuel control system will compensate for this speed reduction by opening the fuel valve. The rate at which the fuel flow is increased is determined by current operating functions of the fuel control system. However, because of the abrupt nature of surge, the rate-of-change in the flow rate of fuel is extremely high. This rapid increase of fuel to the combustor may lead to dangerous excursions in temperature, resulting in high temperatures in gas turbine elements.

With the addition of a new function to the fuel control system's operation, improved regulation of the rate of increase of fuel is achieved. This new function would receive a signal that either surge or a change in load had been detected. Next, a signal is transmitted to the fuel valve actuator, regulating fuel to the combustor, thus power to the power turbine, thereby preventing overspeeding. After that, the rate-of-change of the fuel valve is limited for a period of time. Once recovery has been accomplished, the allowable change rate of the fuel valve is gradually returned to a normal operating setting.

This invention offers considerable economic advantages by its method for lessening process upset and turbine damage (to both gas generator turbines and power turbines). Additional spin-off benefits would better ensure efficient operation; extend the intervals between scheduled shutdowns; and increase annual monetary savings. The advantages and benefits derived from this improved control method are applicable to single, two, and three shaft gas turbines.

BRIEF DESCRIPTION OF THE DRAWINGS

FIG. 2 shows the effects of surge on turbocompressor power versus time.

FIG. 3 shows the effects of surge on rotational speed of the power turbine shaft versus time.

BEST MODE FOR CARRYING OUT THE INVENTION

To protect a gas turbine from damaging excursions (thermal and speed) during surge cycles of a process turbocompressor, fuel flow to the gas turbine's combustion chamber must be easily and accurately controlled. The control for this invention alleviates these excursion problems by limiting the rate at which the fuel control system's output is allowed to relocate the combustor's fuel valve during the recovery stage. This allowable rate is then gradually returned to the level of normal operation.

Figure 1:
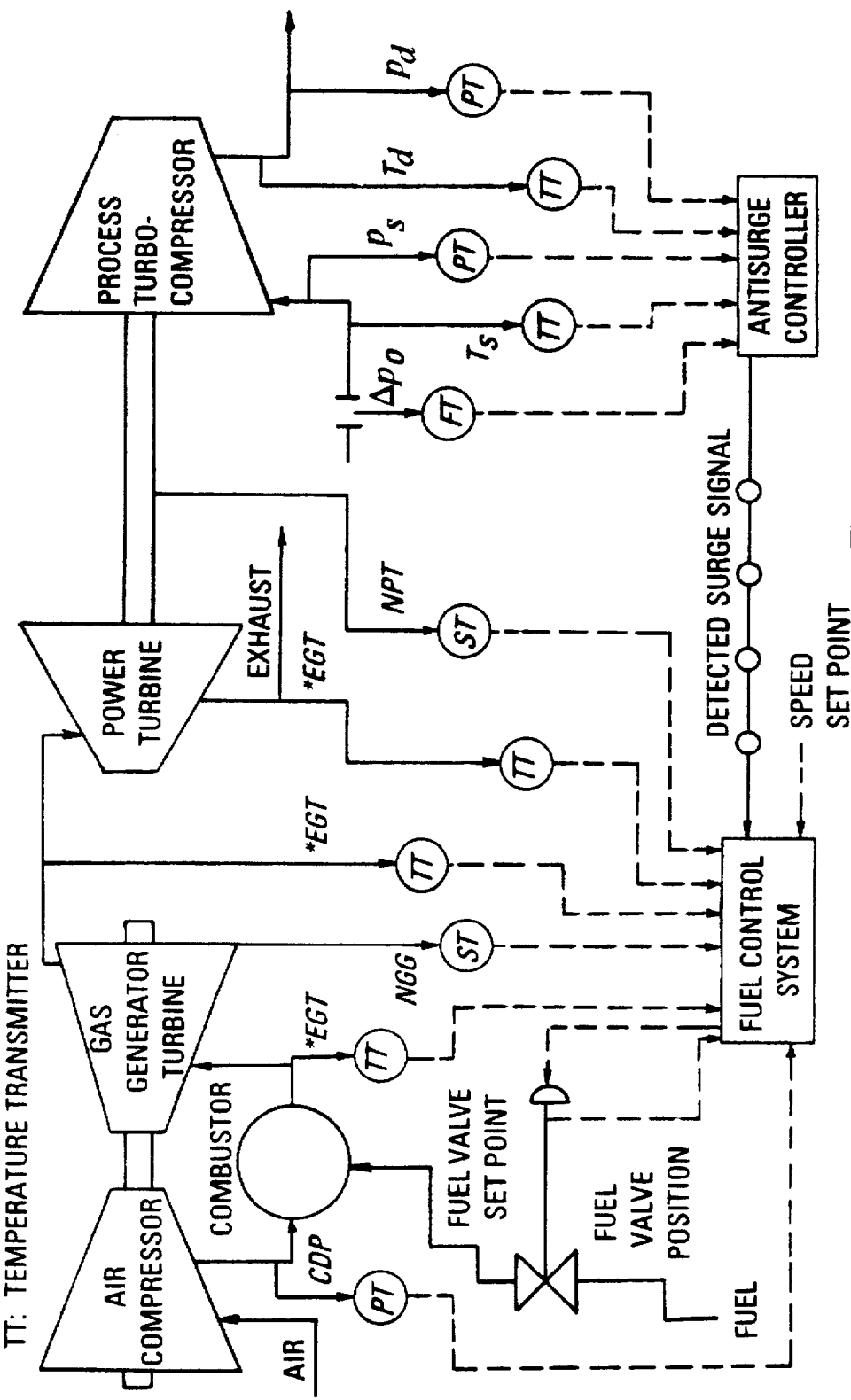
FIG. 1 shows a schematic diagram representing a turbomachinery train comprising a gas turbine, a process turbocompressor, a fuel control system, and an antisurge control system.

FIG. 1 shows a turbomachinery train comprising a gas turbine, a process turbocompressor, a fuel control system, and an antisurge control system. The detection and control of both surge and load rejection are brought about by a combination of open and closed loop responses. These responses are functions of process input signals from monitoring devices located throughout the compressor-process system. These and other signals also interact with the fuel control system. This system transmits a signal to the fuel valve actuator that positions the fuel valve.

The principal risk from surge cycles is mechanical damage, but surge also represents a control problem for the gas turbine. The problem arises because the power absorbed by the process turbocompressor drops dramatically at the onset of surge. When positive flow is restored in the turbocompressor, the power required rises quickly to a magnitude exceeding the pre-surge value (assuming the antisurge control system is functioning properly). FIG. 2 shows the power trend of a turbocompressor in surge.

There are several parameters, associated with a gas turbine, which should not be permitted to exceed certain limits. Two parameters of significance to this invention are rotational speed of the shaft transferring power to the load (in this case a process turbocompressor), and exhaust gas temperature.

Under normal PID (Proportional-Integral-Derivative) control, when the process turbocompressor surges, control action of the fuel control loop is too sluggish to avoid overspeeding the shaft. However, the control action can be too aggressive in attempting to avoid rapid deceleration of the shaft during surge recovery, with the potential result being high temperatures in the turbine. When the power absorbed by the turbocompressor drops off at the onset of surge, rotational speed will increase, as shown in FIG. 3, which displays a comparison between normal PID control (dashed line) and the improved control introduced by this invention. The governing relation is:

$$\frac{I}{2} \frac{dN^2}{dt} = P_T - P_L$$

where I is the moment of inertia of all rotating elements on the shaft; N is the rotational speed of the shaft; t is time; $P_T$ is the power produced by the turbine driving the shaft; and $P_L$ is the power absorbed by all loads on the shaft—including the process turbocompressor.

Since $P_L$ drops off at the onset of surge, the only way to avoid increasing N is to decrease $P_T$—to keep the right-hand side of the equation near zero. The normal PID used for fuel control is too slow to be effective in this. The problem of overspeeding, due to PID control being too slow, can be overcome through feedforward control. By monitoring the process turbocompressor, surge can be detected. A signal indicating that surge has occurred is communicated to the fuel controller. The fuel control function then reacts to reduce its output (representing fuel flow) to lessen the power sent to the process turbocompressor. This will reduce or eliminate the speed overshoot.

Figure 4:
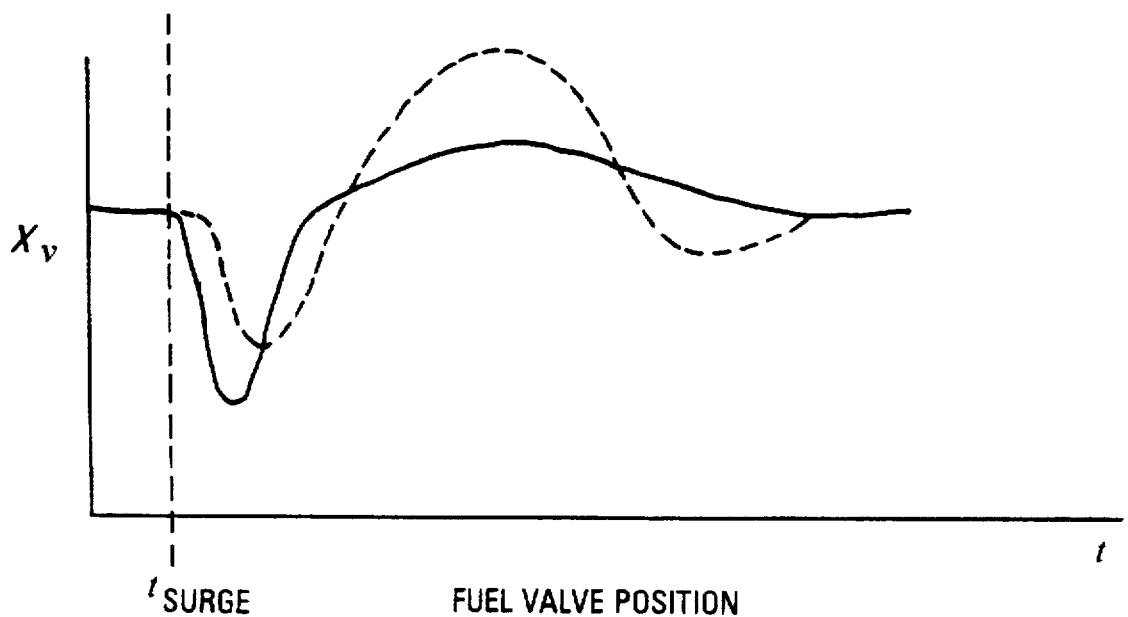
FIG. 4 shows the effects of surge on the fuel valve position versus time.

When the process turbocompressor begins to recover from surge, the power it requires will increase quickly (see FIG. 2). The rotational speed (N) will tend to drop off according to the above equation and as shown in FIG. 3. The tendency of the fuel controller will be to increase fuel flow to the combustor to compensate for speed reduction. The problem this can cause is a rich fuel/air mixture and, thus, high combustion temperatures. The fuel valve position versus time is shown in FIG. 4 which also compares the normal PID control (dashed line) to the improved control of this invention.

One way to avoid exceeding the temperature limits of the gas turbine is to limit how quickly the fuel valve can be opened. The quality of speed control is sacrificed somewhat in favor of protecting the gas turbine from sustaining damage due to high temperatures. At the point at which the turbocompressor enters into recovery from surge, the fuel flow rate is too low due to the previous low power demands. Causing the fuel valve to behave sluggishly at this point results in very poor speed recovery. For that reason, the set point for the valve should be returned to a position it held just prior to the onset of surge. Once this has been accomplished, the rate at which the set point is allowed to change is limited.

Figure 5:
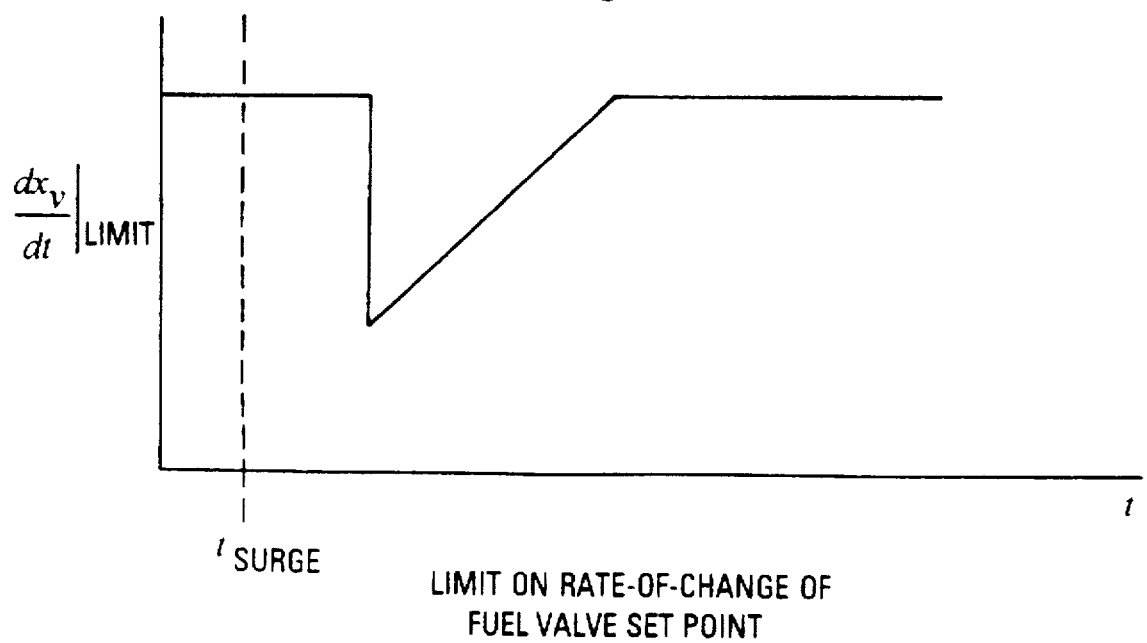
FIG. 5 shows the limit on the rate-of-change of the fuel valve set point versus time, as a result of surge.

The rate-of-change limit cannot be applied continually, since this would result in ongoing, inadequate speed control. Therefore, the limit on the rate at which the set point is allowed to change, is removed gradually. This action is initiated, once the rate is reduced, by a ramping function (between the low and normal values) that immediately begins to return the rate to a normal setting. The limit on the rate-of-change of the fuel valve set point versus time is depicted in FIG. 5.

Figure 6:
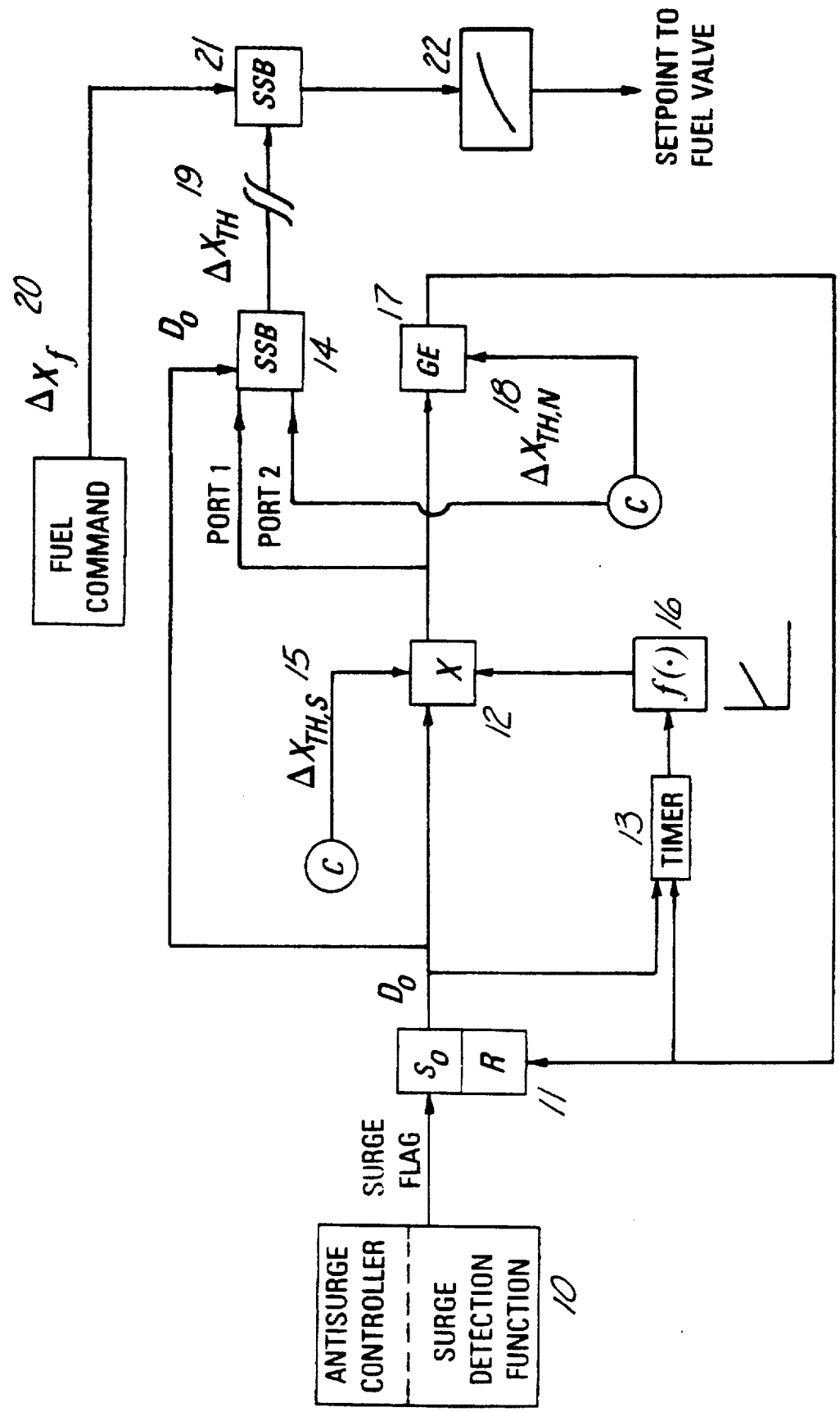
FIG. 6 shows a block diagram of this invention as a feedforward system under proportional-integral-derivative control.

FIG. 6 shows a block diagram of this invention as a feedforward system under PID control, in which a surge or load rejection detection function 10 enables a set/reset block 11 once the surge flag has been set true. An output, $D_o$, then acts as an enabling input to a multiplier 12 and a timer 13, and also acts as a logic input to a signal-selection block 14. Furthermore, $D_o$ synchronizes the above mentioned function blocks—between the start of a rapid unloading sequence (as seen by the gas turbine) and recovery from load rejection over that period of time.

The timer 13 and a function generator 16 together generate a signal which varies over time. Multiplying the function-generator signal 16 by a surge-threshold signal 15 results in a multiplier output 12 which also varies over time. The duration that this signal is present is detected by the time period during which the digital signal ($D_o$) is ON. $D_o$ synchronizes the START and END of a rapid unload sequence up to its recovery period. In essence, the timer 13, function generator 16, and multiplier 12 provide a function which ramps the surge-threshold signal 15 to a normal-threshold signal 18 value over a period of time.

The surge-threshold signal 15 defines the rate-of-change of set point to the fuel valve once a rapid change in load is sensed by the gas turbine. The rapid change in load, sensed by the gas turbine, could be due to process turbocompressor surge or to any other load rejection mechanism. The normal threshold signal 18 defines the faster rate of change of set point to fuel valve once the gas turbine has recovered smoothly from a rapid unloading sequence, or has been operating for a period of time with almost a fixed load. This value serves as an input to the signal-selection block (Port 1) 14 and to a greater than or equal block 17.

The signal to the greater than or equal block 17 is then compared to the normal-threshold signal 18. Should the output from the multiplier block 12 be less than the normal-threshold signal 18, the output value of the greater than or equal block 17 will be 0. Conversely, an output value of 1 will reset the set/reset block 11, and will also disable the timer 13.

The input to Port 1 of the signal-selection block 14, is compared with a Port 2 input from the normal-threshold signal 18. If the logic input ($D_o$) to the signal-selection block 14 is true, the Port 1 value will effect a resultant output $\Delta X_{TH}$ 19; but should the $D_o$ value not be true, the resultant output will assume the Port 2 value.

As long as $D_o$ is present, the signal-selection block 14 will transmit a value of rate of change of set point to fuel, as determined by the ramping signal from the multiplier 12.

Once sufficient time has elapsed, during which the gas turbine has recovered from a load rejection event, signal $D_o$ is reset. Immediately prior to reset of $D_o$, the signal from the ramping function-generation blocks 12, 13, 15, 16 will equal the value of the normal-threshold signal 18. As soon as the surge-threshold signal 15 is ramped to the value of the normal-threshold signal 18, $D_o$ is reset. Thus, by resetting $D_o$ to 0, the signal from the ramping function-generation blocks 12, 13, 15, 16 will be prevented from going above the value of the normal-threshold signal 18. During or after the time period when $D_o$ is absent (reset), the signal selection block 14 will continually transmit a value of the normal-threshold signal 18 as the maximum rate-of-change of set point to fuel valve. Note that the surge-threshold signal 15 and the normal-threshold signal 18 could be varied continuously over the range of operation of the gas turbine, or calculated as a function of the load on the gas turbine. Therefore, the variable rate of change of set point to fuel valve from the signal selection block 14, is the signal, $\Delta X_{TH}$ 19, which interacts with a signal-selection block 21.

FIG. 6 also shows the interaction of the invention's output signal, $\Delta X_{TH}$ 19, and an incremental fuel flow command, $\Delta X_f$ 20. This command signal originates at a fuel command block 20 and consists of incremental changes in fuel flow command to the fuel valve as a result of (a) predetermined or calculated reduction in fuel flow to the gas turbine upon an initiation of a rapid unloading sequence, (b) closed loop PID control of power turbine speed, and (c) various limiting loop-responses of variables, such as exhaust or inlet gas turbine temperatures, air compressor discharge pressure, acceleration or deceleration limit clamps, and high or low pressure stage gas turbine speeds. The interaction of these two signals occurs at a signal-selection block 21 which selects either high or low between $\Delta X_f$ and $\Delta X_{TH}$, depending on the signs of the incremental changes in fuel-flow command-low selection when $\Delta X_f > 0$, and high selection when $\Delta X_f < 0$.

The signal-selection block 21 serves as a rate limiter for the changes in set point to the fuel valve. If the incremental changes in the fuel flow command ($\Delta X_f$) are greater than the value for rate of change of set point to fuel valve ($\Delta X_{TH}$) and the fuel-flow command ($\Delta X_f$) is such that more power is demanded by the fuel control system, the signal-selection block 21 will then limit the incremental changes in fuel flow command ($\Delta X_f$) to a lower value of $\Delta X_{TH}$—this action limits $\Delta X_f$ to an allowable value of rate-of-change of set point to fuel valve by means of a low signal selection. On the other hand, if the fuel flow command ($\Delta X_f$) is such that more power is demanded by the gas turbine, and the incremental changes in fuel flow command ($\Delta X_f$) are lower than the value for the rate of change of set point to fuel valve ($\Delta X_{TH}$), the signal-selection block 21, by means of a low signal selection, will transmit the value of $\Delta X_f$ as the change in set point to fuel valve. Similarly, a high signal selection is employed by the signal-selection block 21 between $\Delta X_{TH}$ and $\Delta X_f$ if the fuel flow command $\Delta X_f$ is such that less power is demanded by the fuel control system. Next, a function characterizer 22 characterizes the output from the signal-selection block 21, thereby linearizing the relationship between the fuel valve's position and the flow through it.

Obviously many modifications and variations of the present invention are possible in light of the above teachings. It is, therefore, to be understood that, within the scope of the appended claims, the invention may be practiced otherwise than as specifically described.

We claim:

1. A method for preventing thermal excursions in a turbomachinery train comprising a gas turbine, a variable load, and a variable fuel flow when the gas turbine is driving the load and said load increases suddenly, the method comprising the steps of
   (a) sensing a feedforward signal indicating a sudden load increase; and
   (b) reducing the maximum rate at which the fuel flow set point is changed.

2. The method of claim 1 wherein the rate at which the fuel flow set point is limited, is predetermined.

3. The method of claim 2 wherein the predetermined rate is variable during operation.

4. A method for controlling a turbomachinery train comprising a gas turbine, a variable load, and a variable fuel flow, the method comprising the steps of:
   (a) sensing a signal that indicates a sudden load increase, and generating a load increase detection signal;
   (b) generating a control signal in response to the load increase signal, to set the maximum rate at which a fuel flow set point is allowed to change; and
   (c) modulating the fuel flow in response to the fuel flow set point.

5. A method for preventing thermal excursions in a turbomachinery train comprising a gas turbine, a variable load, and a variable fuel flow having a normal rate of change of flow, when the gas turbine is driving the load and said load suddenly increases, the method comprising the steps of:
   (a) sensing a feedforward signal indicating a sudden load increase;
   (b) reducing the maximum rate at which the fuel flow set point can be changed; and
   (c) returning to the normal rate of change of the fuel flow set point.

6. The method of claim 5 wherein returning to the normal rate of change of the fuel flow set point is accomplished after a predetermined time period.

7. The method of claim 5 wherein returning to the normal rate of change of the fuel flow set point is effected as a function of time.

8. The method of claim 7 wherein the rate of change of the field flow set point is returned to normal linearly.

9. A method for controlling a turbomachinery train comprising a gas turbine, a variable load, and a variable fuel flow set point having a normal rate of change, the method comprising the steps of:
   (a) sensing a feedforward signal that indicates a sudden increase in load, and generating a load detection signal;
   (b) setting a maximum rate at which the fuel flow set point is allowed to change;
   (c) returning to the normal rate of change of the fuel flow set point; and
   (d) modulating the fuel flow in response to the fuel flow set point.

10. An apparatus for preventing thermal excursions in a turbomachinery train comprising a gas turbine, a variable load, and a variable fuel flow when the gas turbine is driving the load and said load increases suddenly, the apparatus comprising:
    (a) means for sensing a feedforward signal indicating a sudden load increase; and
    (b) means for reducing the maximum rate at which the fuel flow set point can be changed.

11. The apparatus of claim 10 wherein the reducing means includes means for predetermining the rate at which the fuel flow set point can be changed.

12. The apparatus of claim 11 wherein the reducing means includes means for varying the predetermined rate during operation.

13. An apparatus for controlling a turbomachinery train comprising a gas turbine, a variable load, and a variable fuel flow, the apparatus comprising:
- (a) means for sensing a signal that indicates a sudden load increase and generating a load increase detection signal;
- (b) means for generating a control signal in response to the load increase signal, to set the maximum rate at which a fuel flow set point is allowed to change; and
- (c) means for modulating the fuel flow in response to the fuel flow set point.

14. An apparatus for preventing thermal excursions in a turbomachinery train comprising a gas turbine, a variable load, and a variable fuel flow having a normal rate of change of flow, when the gas turbine is driving the load and said load increases suddenly, the apparatus comprising:
- (a) means for sensing a feedforward signal indicating a sudden load increase;
- (b) means for reducing the maximum rate at which the fuel flow set point can be changed; and
- (c) means for returning to the normal rate of change of the fuel flow set point.

15. The apparatus of claim 14 wherein the returning means includes means for returning to the normal rate of change of the fuel flow set point after a predetermined time period.

16. The apparatus of claim 14 wherein the returning means includes means for returning to the normal rate of change of the fuel flow set point as a function of time.

17. The apparatus of claim 16 wherein the returning means includes means for returning to the normal rate of change of the fuel flow set point linearly.

18. An apparatus for controlling a turbomachinery train comprising a gas turbine, a variable load, and a variable fuel flow set point having a normal rate of change, the apparatus comprising:
- (a) means for sensing a feedforward signal that indicates a sudden increase in load and generating a load detection signal;
- (b) means for setting a maximum rate at which the fuel flow set point is allowed to change;
- (c) means for returning to the normal rate of change of the fuel flow set point; and
- (d) means for modulating the fuel flow in response to the fuel flow set point.

19. A method for controlling a turbomachinery train comprising a gas turbine, a variable load, and a variable fuel flow, the method comprising the steps of:
- (a) sensing a signal that indicates a full or partial load rejection, and generating a load rejection detection signal;
- (b) generating a control signal in response only to the load rejection detection signal, to reduce a fuel flow set point; and
- (c) modulating the fuel flow in response to the fuel flow set point.

20. An apparatus for controlling a turbomachinery train comprising a gas turbine, a variable load, and a variable fuel flow, the apparatus comprising:
- (a) means for sensing a signal that indicates full or partial load rejection and generating a load rejection detection signal;
- (b) means for generating a control signal in response only to the load rejection detection signal, to reduce a fuel flow set point; and
- (c) means for modulating the fuel flow in response to the fuel flow set point.

* * * * *